Feb. 14, 1961  W. L. LOSER, JR  2,971,489
RUDDER CONTROL

Filed March 30, 1956  3 Sheets-Sheet 1

INVENTOR.
WILLIAM L. LOSER, JR.
BY
ATTORNEYS

Feb. 14, 1961 W. L. LOSER, JR 2,971,489
RUDDER CONTROL
Filed March 30, 1956 3 Sheets-Sheet 2

INVENTOR.
WILLIAM L. LOSER, JR.
BY
ATTORNEYS

Feb. 14, 1961 W. L. LOSER, JR 2,971,489
RUDDER CONTROL
Filed March 30, 1956 3 Sheets-Sheet 3

INVENTOR.
WILLIAM L. LOSER, JR.
BY
ATTORNEYS

United States Patent Office 2,971,489
Patented Feb. 14, 1961

2,971,489
RUDDER CONTROL
William L. Loser, Jr., Philadelphia, Pa.
(303 Park Ave., Maple Shade 3, N.J.)
Filed Mar. 30, 1956, Ser. No. 575,077
4 Claims. (Cl. 114—154)

This invention relates to steering gear for vessels and, more particularly, to steering gear of the type used in conjunction with steering wheels and rudders of small boats.

Ordinarily, very little effort is required to steer small motor-powered type vessels or to maintain them on course. However, because of their speed and relatively light weight, considerably more skill is required to maneuver such vessels into and out of port and through congested port areas. Since small boats usually respond very quickly to rudder movement, it is sometimes necessary to move the rudder from one extreme position to another at a very great rate of speed. An object of this invention, therefore, is to provide a steering gear for motor vessels that is highly responsive and efficient in operation.

Another object of this invention is to provide a control system for vessels to positively effect quick rudder movement in response to the rotation of the steering wheel.

A further object of this invention is to provide control connections between the steering wheel and rudder of a motor vessel that is operative to effectively transmit movement between the rudder and the steering wheel.

Still another object of this invention is to provide variable ratio linkage for use in conjunction with steering wheels and rudders of small boats.

A more specific object of this invention is to provide variable ratio linkage for use in conjunction with steering wheels and rudders of small boats to provide a high ratio of wheel to rudder movement on course and a fast rudder to wheel response for fast maneuvering of the vessel.

Further objects, advantages and features of the present invention will become apparent from a consideration of the following description and accompanying drawings, in which.

The motive power of the vessels is not shown since such showing is not necessary for an understanding of this invention which is directed to the steering gear.

Figure 1:
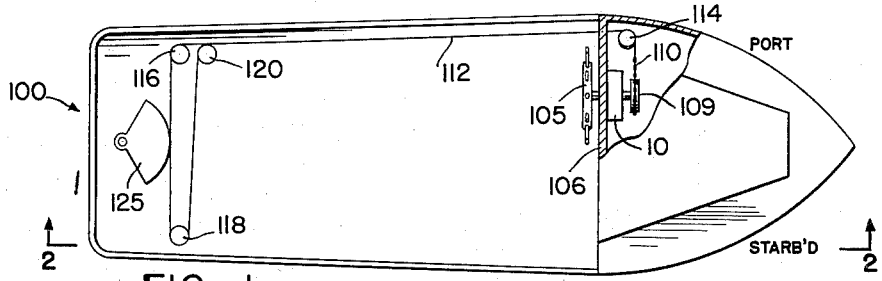
Figure 1 is a top plan view of a vessel having steering gear arranged in accordance with this invention, showing one arrangement thereof.
Figure 2:
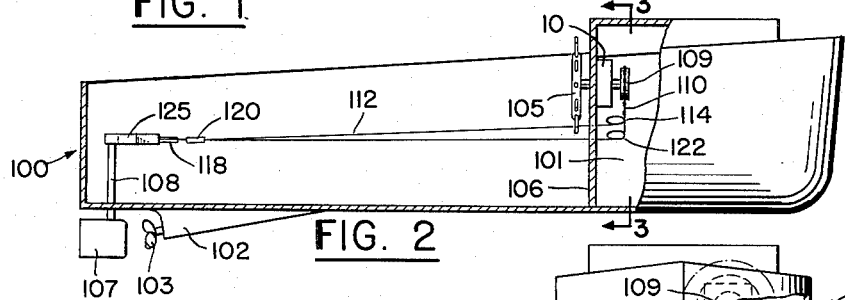
Figure 2 is a cross sectional view taken along line 2—2 of Fig. 1 showing the interior arrangement of the steering gear.
Figure 3:
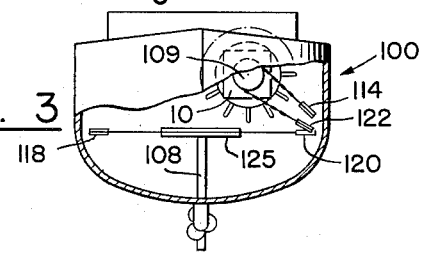
Figure 3 is a sectional view taken along line 3—3 of Figure 2.

Referring now to Figure 1 of the drawing which illustrates one embodiment of the present invention, a boat hull 100 having a cabin 101 is shown to have a drive shaft 102 and a screw 103 secured at the rearward end thereof for propelling the vessel through water. A steering wheel 105 is shown mounted on a forward bulkhead 106 of the vessel to control the movements of a rudder 107 that is secured to a rudder post 108 at the rear end of the vessel, immediately adjacent to the driving screw 103.

A variable ratio linkage unit 10 is disposed on the forward side of the bulkhead 106 and has a chain sprocket 109 that is secured to the driven end of the variable ratio unit. A sprocket chain 110 which is of substantially greater length than the perimeter of the sprocket 109 is in operative engagement therewith and has a continuous cable 112 secured at each extremity. A plurality of pulleys are arranged between the forward and the rear end of the vessel, over which the cable is trained in a predetermined manner. The path of the cable from one point of attachment to the chain 110 is over a first forward pulley 114 rearwardly to a first rearward pulley 116 across the vessel to a return pulley 118 from which the cable returns over a second rearward pulley 120 to a second forward pulley 122 to engagement with the opposite extremity of the chain 110. A rudder quadrant 125 is operatively connected to the cable system at a point substantially midway between the first rearward pulley 116 and the return pulley 118. As shown in the drawing, the chain sprocket 109 has a radius approximately equal to one-third of the radius of the quadrant 125. This is to effect a mechanical advantage such that a slight movement of the rudder results in a substantially increased movement of the steering wheel 105, thereby providing a high ratio of wheel to rudder movement. While this particular ratio has been found quite satisfactory in operation, it is to be understood that this ratio may be varied for any particular purpose or change, according to certain circumstances. The several pulleys over which the cable is trained, however, are of substantially the same diameter in that their function is to merely guide the movement of the cable between the steering wheel assembly and the rudder assembly.

Figure 4:
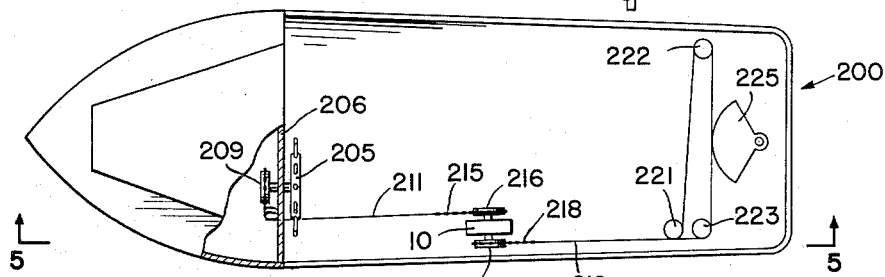
Figure 4 is a top plan view of a vessel having steering gear in accordance with this invention, but showing a modified arrangement thereof.
Figure 5:
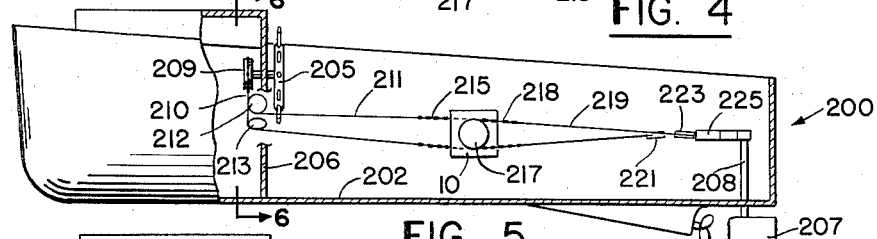
Figure 5 is a sectional view taken along line 5—5 of Figure 4 showing the interior arrangement of the associated elements.
Figure 6:
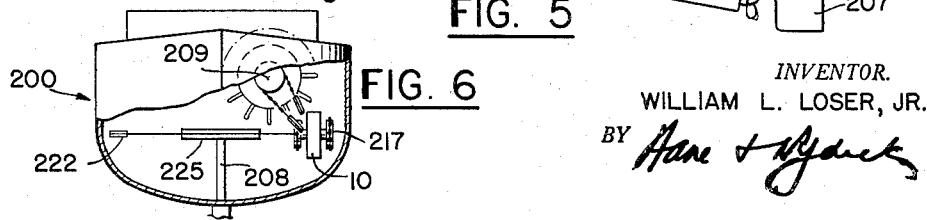
Figure 6 is a transverse sectional view taken along line 6—6 of Figure 5.

Referring now to Figures 4 through 6 of the drawing a second embodiment of this invention is shown wherein the steering gear is in a modified arrangement. In this case the variable ratio unit 10 is disposed in the bilge section 202 of the hull 200. A steering wheel 205 is rotatably mounted on the bulkhead 206 and is operatively connected to the rudder 207 and rudder post 208 at the rear of the vessel. A sprocket wheel 209 that is disposed on the opposite side of the bulkhead is driven by the steering wheel 205. A sprocket chain 210 of considerably greater length than the perimeter of the sprocket wheel is in engagement therewith and has a pair of flexible cables 211, each secured at one extremity of the sprocket chain. Both of the flexible cables 211 are trained about associated pulleys 212, 213 that are positioned adjacent to the bottom of the vessel. A second sprocket chain 215 of similar length to the sprocket chain 210 is operatively engaged with a sprocket wheel 216 that is disposed on the input side of the variable ratio unit 10. The output side of the variable ratio unit comprises a sprocket wheel 217 that has a sprocket chain 218 similarly engaged therewith. Another length of flexible cable 219 has its ends secured to respective ends of the sprocket chain 218 and this cable extends rearwardly about a first pulley 221 into rotatable engagement with a return pulley 222 from which it engages a directional pulley 223 from where it extends into securing engagement with the opposite end of the chain 218. The rudder quadrant 225 is secured to the latter flexible cable between the pulleys 222, 223, that direct the cable transversely of the vessel.

It will be recognized, therefore, that rotation of the steering wheel 205 is transmitted to the rudder quadrant 225 through the aforementioned series of chains and cables. In this case, however, the variable ratio unit is disposed midway between the steering wheel and the rudder. It is to be noted, however, that each of the sprocket wheels 209, 216 and 217 are of the same diameter and that the diameter of each of these sprocket wheels is one-third of the diameter of the rudder quadrant 225. It is this ratio that affords the mechanical advantage to the rudder so that quick response is obtained.

Figure 7:
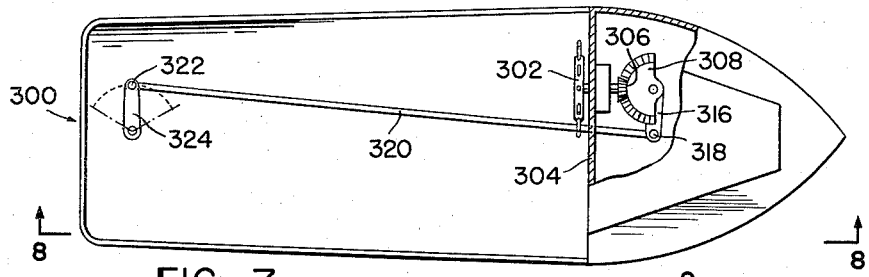
Figure 7 is a top plan view of a vessel embodying steering gear in accordance with this invention showing another modified arrangement thereof.
Figure 8:
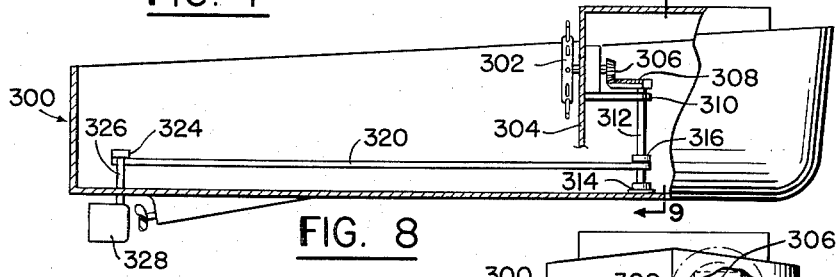
Figure 8 is a longitudinal sectional view taken along line 8—8 of Figure 7 showing the interior arrangement of the related elements.
Figure 9:
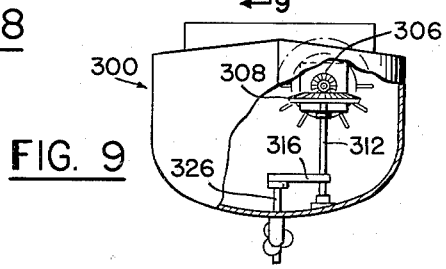
Figure 9 is a transverse sectional view taken along line 9—9 of Figure 8.

Referring now to Figures 7 through 9 of the drawing, a still further modification of the present invention is shown, wherein a series of links are used in place of the flexible cable and sprocket assemblies of the foregoing embodiments. In this instance the steering of the vessel is controlled by means of a steering wheel 302 that is rotatably supported on the forward bulkhead 304, through which extends into engagement with the input side of the variable ratio unit 10 that is supported on the opposite side of the bulkhead. A bevel gear 306 that is rigidly secured to the output end of the variable ratio unit 10 is in meshing engagement with a gear quadrant 308 that is secured to a shaft 312 which extends downwardly through a rotating bearing element of a stationary support member 310, into rotatable engagement with a bearing block 314 at the bottom of the vessel. A link 316 is secured to the rotatable shaft 312 in perpendicular relationship thereto and terminates in a universal coupling 318. This coupling supports the forward end of a longitudinal link 320 which extends rearwardly to engagement with a third link 324, to which it is pivotally secured by means of a universal coupling 322 engaged with the adjacent ends thereof. This link 324 is of similar length as the forward link 316 and is secured to the rudder shaft 326 that extends downwardly through the bottom of the vessel and terminates in a fixed rudder assembly 328. The mechanical advantage in this embodiment is obtained through the ratio of the gear quadrant 308 to the bevel gear 306 which is preferably three to one. Of course the ratio can be altered by altering the ratio between these two gears, or, if an alternate method is preferred, by varying the respective lengths of the forward end rear links 316, 324.

It will be observed that the rotation of the steering wheel is transmitted to the rudder assembly through the respective bevel gear, gear quadrant, link 316, longitudinal link 320, rear link 324, and thence to the rudder. Through this arrangement a very positive connection is made between the related elements whereby quick response to both wheel and rudder actions is obtained.

A variable ratio linkage unit 10, that may be used in conjunction with any of the aforementioned steering gear arrangements, is shown and described in Figures 10 through 13 of the drawing. As more clearly shown in Figure 11, the unit 10 is shown to have a pair of parallel plates 401, 403 that are held in fixed spaced relationship by a plurality of spacer bolts 405 and associated nuts 406. An input shaft 408 is rotatably secured to one plate 401 by means of a ball bearing assembly 410. The inner extremity of the input shaft terminates in an integrally secured lever A, 412, that is provided with an internal longitudinal slot 414 which embraces a ball bearing assembly 415 associated with the output side of the unit.

Figures 10, 11:
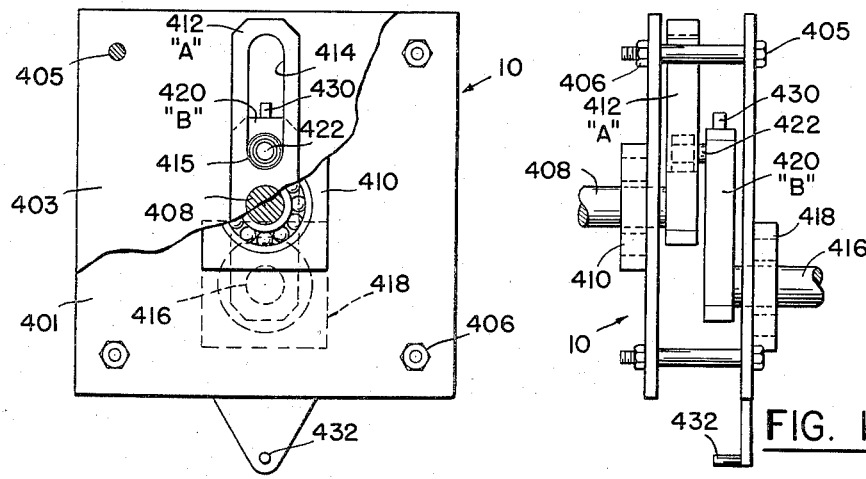
Figure 10 is a front elevational view of a variable ratio unit made in accordance with this invention.
Figure 11 is a side elevational view taken along line 11—11 of Figure 10.
Figure 12:
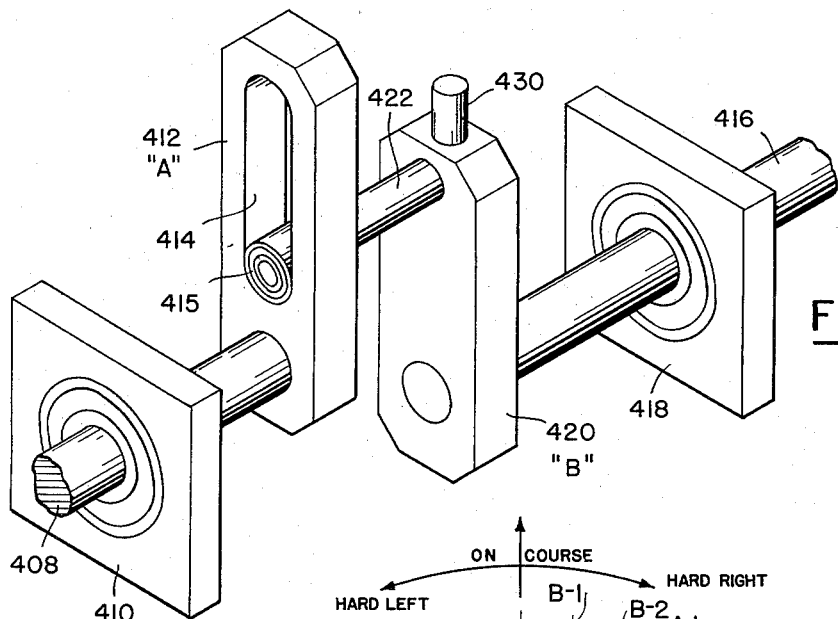
Figure 12 is a perspective view with parts removed, showing the variable ratio unit in partly exploded arrangement.

Referring now to Figure 11 of the drawing, an output shaft 416 is rotatably secured to the other plate 403 by means of a ball bearing assembly 418. The inner extremity of the input shaft is integrally secured to one end of a lever B, 420, that has a short connecting shaft 422 rigidly secured to the opposite longitudinal extremity thereof and which rotatably supports the bearing 415. A stop 430 is integrally secured to the outermost extremity of the output lever B and is adapted to engage a similar stop 432 that is secured to the lowermost portion of the plate 403, so as to prevent the rotational movement of either lever more than 180 degrees in either direction from the normal on-course position. The axes of all of the shafts 408, 416, 422 are parallel and spaced from each other, which relationship provides the variable ratio of the unit in connection with the associated elements.

The unit is shown in the drawing in a normally, on course, centered, position, whereby the rudder by connections therewith through the steering gear assembly, is positioned along the longitudinal plane of the vessel. As such, rotation of the steering wheel is operative to cause rotation of the input shaft of the linkage unit 10 in either a clockwise or counter-clockwise direction, as the case may be, to alter the course of the vessel.

Figure 13:
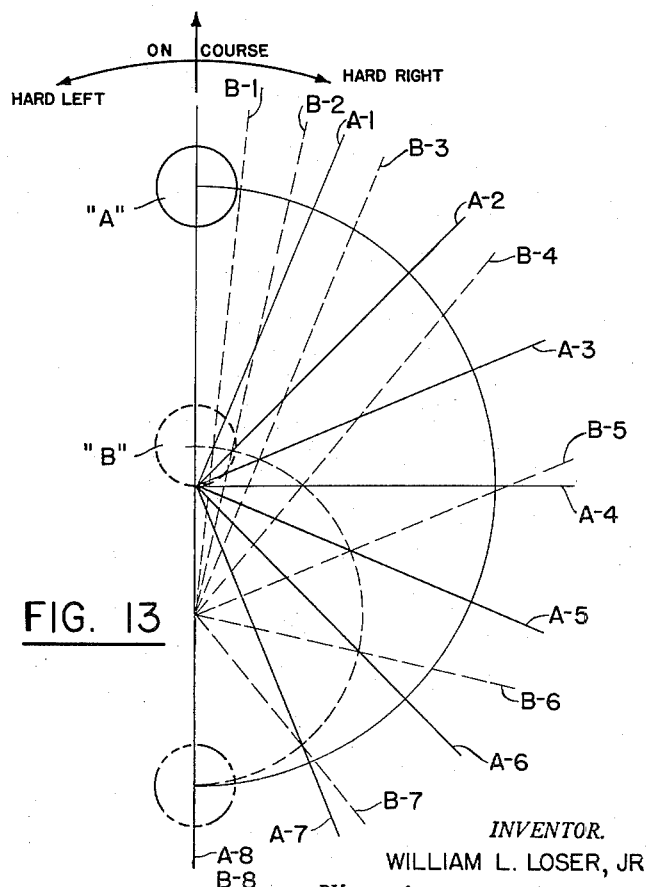
Figure 13 is a schematic diagram showing the variation of movements between associated elements of the variable ratio unit.

Referring now to Figure 13 of the drawing, a plurality of positions are shown for both the input lever A and the output lever B. It will be recognized that as the input lever A is rotated in a clockwise position, as viewed in Figure 13, from an initial on-course position A–1 to a first extreme hard-over position A–8, the corresponding movement of lever B–1 lags initially, but is equalized at the hard-over position B–8 such that the ratio of rotation of the input shaft 408 to the output shaft 416 is high at on course rudder position, but substantially lower at hard-over positions. Of course, the same ratios will be obtained in rotating the lever A in a counter-clockwise direction, to move the rudder to a second extreme, hard-over position. Therefore, while the ratio is such that substantial wheel movement is required to move the rudder from an on-course position, relatively slight movement of the wheel is required to move the rudder hard-over for fast maneuvering. It will be appreciated that the specific ratio of the unit may be altered by altering the relative spacing between the input and output shafts.

While this invention has been described with particular reference to the specific form shown in the drawing, it is to be understood that such showing is for illustrative purposes only and is not to be construed as imparting limitations upon the invention which is best defined by the claims appended hereto.

I claim:

1. Steering gear for vessels comprising, in combination, a steering wheel, a rotatable rudder, fixed ratio control means between said steering wheel and said rudder for transmitting movement therebetween, and variable ratio control means associated with said steering wheel, rudder, and said fixed ratio control means for varying the ratio of the rotational movement of said steering wheel between fixed limits in both directions and the rotation of said rudder, said steering wheel and said rudder being adapted to be mounted upon opposite extremities of the vessel, said fixed ratio control means including a first wheel adapted to be rotated by said steering wheel, a return wheel, and a plurality of guide wheels, flexible cable means operatively engaging said first wheel, said return wheel, and said guide wheels, and said rudder being operatively connected to said flexible cable means between the points of engagement thereof with said return wheel and said guide wheels.

2. Steering gear as set forth in claim 1, wherein said variable ratio control means is connected between said steering wheel and said first wheel.

3. Steering gear as set forth in claim 1, wherein said variable ratio control means is connected between said first wheel and said guide wheels.

4. Steering gear for vessels comprising, in combination, a steering wheel adapted to be mounted upon one extremity of a vessel, a rudder adapted to be rotatably mounted upon the opposite extremity of the vessel, fixed ratio control means operatively connected to said steering wheel and said rudder for transmitting movement therebetween comprising a bevel gear and a quadrant gear of predetermined relative diameters in meshed driving engagement with each other, said bevel gear being secured to said steering wheel and said quadrant gear being operatively connected to said rudder, and variable ratio control means connected between said steering wheel and said bevel gear for varying the ratio of the rotational movement of the steering wheel to that of said bevel gear between fixed limits in both directions whereby rotation of said steering wheel is operative to effect the rotation of said rudder through said bevel gear and said quadrant gear in accordance with a predetermined varying wheel to rudder movement ratio.

References Cited in the file of this patent

UNITED STATES PATENTS

| | | |
|---|---|---|
| 273,509 | Gass et al. | Mar. 6, 1883 |
| 498,160 | Dyer et al. | May 23, 1893 |
| 978,746 | Heusted | Dec. 13, 1910 |
| 1,115,000 | Martin | Oct. 27, 1914 |
| 1,403,318 | Hansen | Jan. 10, 1922 |
| 2,392,056 | Morse | Jan. 1, 1946 |